US009769133B2

(12) United States Patent
Pogorelik et al.

(10) Patent No.: US 9,769,133 B2
(45) Date of Patent: Sep. 19, 2017

(54) PROTECTING USER IDENTITY AND PERSONAL INFORMATION BY SHARING A SECRET BETWEEN PERSONAL IOT DEVICES

(71) Applicant: McAfee, Inc., Santa Clara, CA (US)

(72) Inventors: Oleg Pogorelik, Lapid (IL); Alex Nayshtut, Gan Yavne (IL); Igor Muttik, Berkhamsted (GB); Justin Lipman, Shanghai (CN)

(73) Assignee: McAfee, Inc., Santa Clara, CA (US)

( * ) Notice: Subject to any disclaimer, the term of this patent is extended or adjusted under 35 U.S.C. 154(b) by 138 days.

(21) Appl. No.: 14/550,474

(22) Filed: Nov. 21, 2014

(65) Prior Publication Data

US 2016/0149878 A1 May 26, 2016

(51) Int. Cl.
| | |
|---|---|
| H04L 29/06 | (2006.01) |
| H04W 12/04 | (2009.01) |
| G06F 21/62 | (2013.01) |
| H04B 13/00 | (2006.01) |
| H04L 9/08 | (2006.01) |
| H04W 12/06 | (2009.01) |
| H04W 4/00 | (2009.01) |

(52) U.S. Cl.
CPC ........ *H04L 63/062* (2013.01); *G06F 21/6245* (2013.01); *G06F 21/6263* (2013.01); *H04B 13/005* (2013.01); *H04L 9/085* (2013.01); *H04W 12/04* (2013.01); *H04W 12/06* (2013.01); *H04L 63/0428* (2013.01); *H04W 4/006* (2013.01); *H04W 4/008* (2013.01)

(58) Field of Classification Search
None
See application file for complete search history.

(56) References Cited

U.S. PATENT DOCUMENTS

| | | | |
|---|---|---|---|
| 8,341,057 B1* | 12/2012 | Wagner | G06Q 40/02 705/36 R |
| 8,515,070 B2* | 8/2013 | Juels | A61B 5/0031 340/10.1 |
| 2002/0114182 A1* | 8/2002 | Piersimoni | G11C 16/10 365/185.01 |

(Continued)

OTHER PUBLICATIONS

Li, Ming and Lou, Wenjing, Data Security and Privacy in Wireless Body Area Networks. IEEE Wireless Communications vol. 17 [online], Feb. 2010 [retrieved on Sep. 3, 2016]. Retrieved from the internet:< URL: http: // ieeexplore.ieee.org/stamp/ stamp.jsp?arnumber=5416350.*

*Primary Examiner* — Malcolm Cribbs
(74) *Attorney, Agent, or Firm* — Blank Rome, LLP

(57) ABSTRACT

A wearable device provides protection for personal identity information by fragmenting a key needed to release the personal identity information among members of a body area network of wearable devices. A shared secret algorithm is used to allow unlocking the personal identity information with fragmental keys from less than all of the wearable devices in the body area network. The wearable devices may also provide protection for other personal user data by employing a disconnect and erase protocol that causes wearable devices to drop connections with an external personal data space and erase locally stored personal information if a life pulse from a connectivity root device is not received within a configurable predefined period.

19 Claims, 9 Drawing Sheets

(56) References Cited

U.S. PATENT DOCUMENTS

| | | | |
|---|---|---|---|
| 2003/0059053 A1* | 3/2003 | Medvinsky | G06F 21/10 380/277 |
| 2004/0172369 A1* | 9/2004 | Persson | G06F 21/6218 705/67 |
| 2005/0010760 A1* | 1/2005 | Goh | G06F 21/6245 713/161 |
| 2009/0198733 A1* | 8/2009 | Gounares | G06F 19/327 |
| 2010/0138908 A1* | 6/2010 | Vennelakanti | G06F 21/33 726/11 |
| 2011/0004651 A1* | 1/2011 | Tuli | G04G 21/08 709/203 |
| 2011/0221590 A1* | 9/2011 | Baker | A61B 5/0002 340/539.12 |
| 2012/0083669 A1* | 4/2012 | Abujbara | G06F 19/3475 600/300 |
| 2012/0242501 A1* | 9/2012 | Tran | A61B 5/0024 340/870.02 |
| 2013/0145160 A1* | 6/2013 | Bursell | G06Q 21/6218 713/168 |
| 2013/0177157 A1* | 7/2013 | Li | H04L 9/083 380/277 |
| 2014/0324912 A1* | 10/2014 | Lei | G06F 21/6218 707/783 |
| 2014/0331061 A1* | 11/2014 | Wright | H04L 9/085 713/189 |
| 2015/0310436 A1* | 10/2015 | Lakshmanan | G06Q 20/40 705/71 |

* cited by examiner

PROTECTING USER IDENTITY AND PERSONAL INFORMATION BY SHARING A SECRET BETWEEN PERSONAL IOT DEVICES

TECHNICAL FIELD

Embodiments described herein generally relate to personal wearable devices and in particular to techniques for protecting the identity of a user by sharing a secret between personal Internet of Things (IoT) devices.

BACKGROUND ART

User identification today relies on the ability of the user to provide a proof of identity such as passport, driver license, etc. This approach suffers from theft and loss. Identity documents could be irreversibly destroyed or modified. In addition, the process of identification often relies on human operation, which is error prone and expensive.

Weaknesses of document-based identification are partially solved today by biometrics-based identification relying on measurements of face shape, fingerprint, voice pattern, etc. Unfortunately, this approach is expensive, mandating creation of an expensive and sensitive biometrics database and does not support cases where identification is performed off-line or where the database is not accessible for some reason. In some instances, individuals may carry identity information in a device that if compromised could put the individual at risk of identity theft or other problems.

Wireless Body Area Networks (BANs) and the wearable computing devices and sensors (in-body, on-body, or near-body) that compose them are expected to proliferate extensively in the next 5 years. When considering BANs and wearables and sensors within an IoT framework, there is a significant amount of data that can be collected externally (beyond the BAN) about the user, much of it without their full knowledge or understanding, including biometrical, bio-behavioral, medical, geodetic location, etc. Some of this data can be captured or transmitted into the cloud without requiring user interaction and consent or through poor setup processes.

There are number of risks associated with wearable IoT devices:

Silent but constant exposure of user data can seriously jeopardize the privacy of the user if not handled properly.

Data pulled from the wrong wearable or sensor might contaminate a user's personal data such as profile, personal preferences etc. It might also trigger false alarms for fraud detection systems.

In some cases, the consequences of showing or loaning a wearable device such as a smart watch to a friend or just staying within close proximity of a wearable device may provide an opportunity for nefarious use by individuals other than the owner, including leakage of personal data, unlocking doors, automated point of sale payments, etc.

To avoid these risks, a user must ensure reliable pairing and secure connection of their wearables and sensors to the appropriate cloud service followed by a connection reset and data wipe when the wearable is not in use or is transferred to a third party. However, as with identification processes, this process is both error prone and cumbersome and often beyond the understanding of many users, particularly when coupled with the weaknesses of document-based or biometric-based identification techniques.

DESCRIPTION OF EMBODIMENTS

Figure 1:
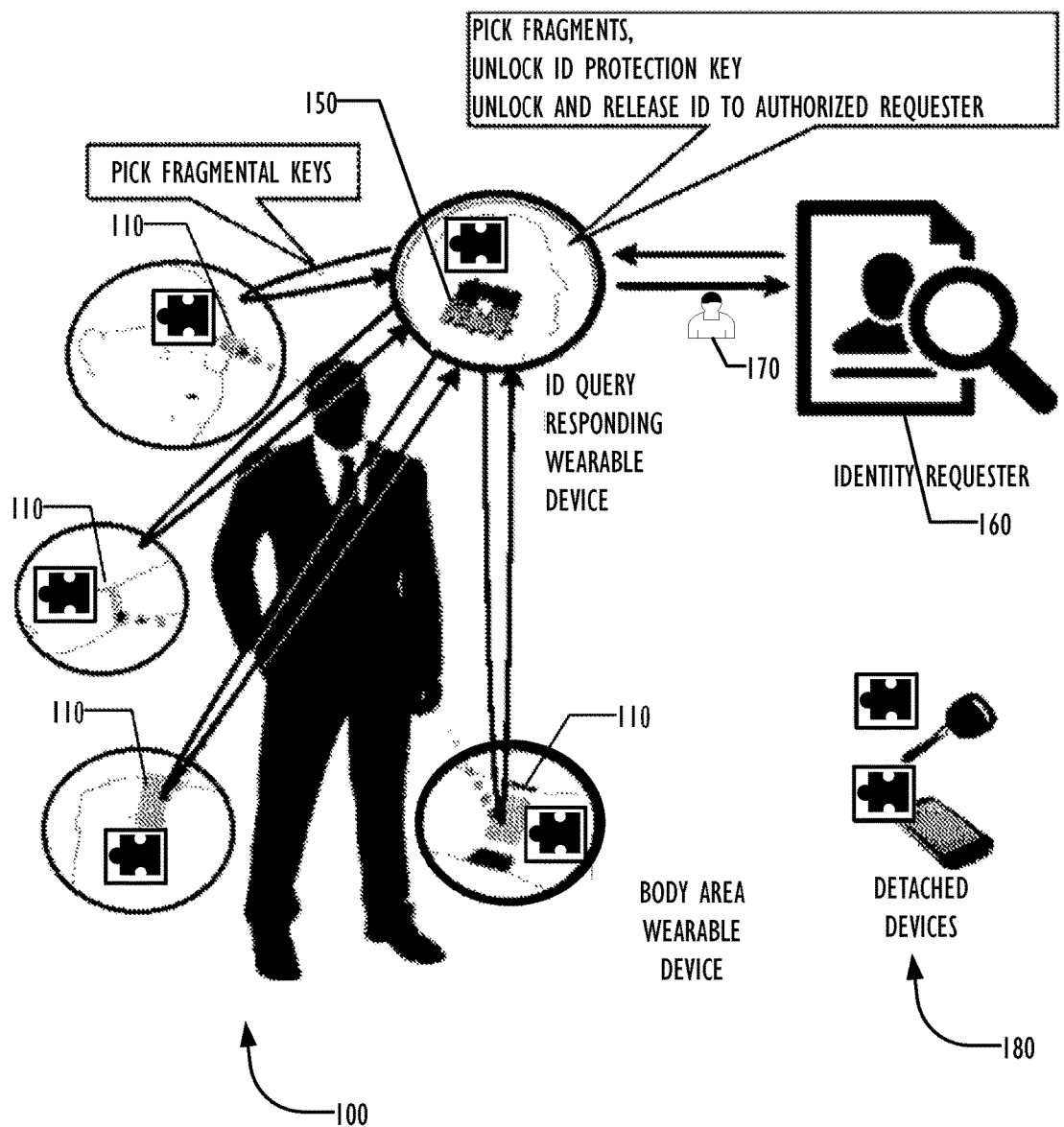
FIG. 1 is a block diagram illustrating a technique for allowing access to personal information using a secret shared among wearable devices according to one embodiment.

In the following description, for purposes of explanation, numerous specific details are set forth in order to provide a thorough understanding of the invention. It will be apparent, however, to one skilled in the art that the invention may be practiced without these specific details. In other instances, structure and devices are shown in block diagram form in order to avoid obscuring the invention. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one embodiment of the invention, and multiple references to "one embodiment" or "an embodiment" should not be understood as necessarily all referring to the same embodiment.

As used herein, the term "a programmable device" can refer to a single programmable device or a plurality of programmable devices working together to perform the function described as being performed on or by a programmable device. Similarly, "a machine-readable medium" can refer to a single physical medium or a plurality of media that together may store the material described as being stored on the machine-readable medium.

As used herein, the term "malware" refers to any software used to disrupt operation of a programmable device, gather sensitive information, or gain access to private systems or networks. Malware includes computer viruses (including worms, Trojan horses, etc.), ransom ware, spyware, adware, scareware, and any other type of malicious program.

The disclosure below describes a new approach for user authentication, focusing on using IoT devices as elements for building an inexpensive, no-lost, thief protected and unbreakable personal Identity that could be used for offline authentication, without a need to access an external database, and therefor supports disconnected and cross domain and geo identification.

In an Internet of Things (IoT) era, every person will have multiple personal IoT devices permanently worn, implanted in, or carried on their body. This environment allows a different approach to identification.

A user's Digital Identity (DI) may be created by a trusted authority and provisioned in all attached IoT devices. The DI can take any desired form and contain any desired pieces of information. The stored DI may be encrypted using a secret sharing algorithm so that to unlock the stored identity a user will need to have a pre-defined number of provisioned personal IoT devices on or in close proximity to the user.

Using the secret sharing algorithm ensures that the DI is not released if user does not have enough provisioned devices on or near the user's body. The necessary number of devices may be configurable, typically being in the range of 5-8 devices. Personal wearable IoT devices act together to store and protect the user's DI. An individual device cannot release the user's DI to a third party if the device is found apart from other devices (such as by being lost or stolen), because none of the IoT devices has all the information needed to unlock the stored identity. Thus, physical control over a found or stolen device does not put the stored identity information at risk.

In one embodiment, user identification/authentication data (UID) is protected with fragmented keys distributed between the user's personal devices. One or more Wide Area Network (WAN) communicating devices perform as a "UID proxy" to manage and filter external identity and authentication communications between the WAN and the BAN. Protecting the UID with fragmented keys and delivering it to individual personal IoT devices is a provisioning step.

FIG. 1 is a block diagram illustrating elements of an IoT-based identity system using a BAN 100 according to one embodiment, composed of a number of Body Area Wearable Devices (BAWDs), which are wearable devices attached to the BAN 100.

In the example of FIG. 1, the BAN 100 comprises several BAWDs 110: an eyeglasses device, a wristband device, a belt clip device, and a wristwatch device. These devices are only examples of BAWDs, and other devices and other numbers and combinations of devices may be worn and used. The BAN 100 may include multiple units of any type of BAWD. Each of the BAWDs 110 is provisioned with a fragment of an encryption key (a "fragmental key") and releases the fragmental key in response to the request coming from a peer ID Query Responding Wearable Device (IDQRWD) 150, which is a wearable IoT device attached to the BAN 100 that communicates with an authorized ID requester over an external communication protocol. The external communication protocol may be any desired or convenient protocol, including Wi-Fi®, Bluetooth®, 3G, Infrared (IR), etc. protocols. (WI-FI is a registered certification mark of Wi-Fi Alliance; BLUETOOTH is a registered certification mark of Bluetooth SIG, Inc.)

The IDQRWD 150 is provisioned with a Personal ID information 170, which is encrypted using a secret sharing algorithm (explained below). In response to an ID request from an ID requester 160, the IDQRWD 150 communicates with at least some of the other BAWDs in the BAN 100 to obtain the fragmental keys needed to decrypt the ID 170.

The IDQRWD 150 does not contain the encryption/decryption key, and cannot provide the ID information 170 to the ID requester 160 without communicating with the BAWDs of the BAN 100 to obtain the key. In one embodiment, fragmental keys from all of the other BAWDs are required to decrypt the ID information 170. In other embodiments, fragmental keys from a subset of the BAWDs may be sufficient to allow decryption of the ID 170. For example, detached BAWDs 180 of FIG. 1 may be provisioned with fragmental keys but not accessible to the IDQRWD 150 when the ID request is made, because the detached BAWDs 180 are too remote, turned off, etc. If sufficient other BAWDs of the BAN 100 are reachable by the IDQRWD 150 to provide fragmental keys, the IDQRWD 150 may be able to respond to the ID request.

In some embodiments, the IDQRWD 150 may be a dedicated ID protection device; in other embodiments, the IDQRWD 150 may be one of the BAWDs of the BAN 100. In some embodiments, the IDQRWD 150 may be provisioned with one of the fragmental keys that are used by the IDQRWD 150 to decrypt the ID information 170, allowing the IDQRWD 150 to send the ID information 170 to the ID requester 160.

The ID information stored by the IDQRWD 150 may be any desired type of information of any desired format. Although described herein as ID information, the ID information 170 may be any protected information, and need not include any specific information about the person's identity.

In some embodiments, the IDQRWD implements an authentication algorithm, so that only authorized ID requesters 160 will be served. In one embodiment, illustrated in FIG. 2, the ID requester 160 provides a fragmental key with the request for personal information, to be combined with fragmental keys from the BAWDs 110 as a way of authenticating the ID requester 160. In such an embodiment, the fragmental key provided by the ID requester 160 may be a required fragmental key. Other authentication techniques may be used as desired, instead of, or in addition to the ID requester providing a fragmental key. In some embodiments, redundancy, overlapping, and duplication of fragmental keys may be allowed to increase tolerance to device faults and errors in communications.

Figure 2:
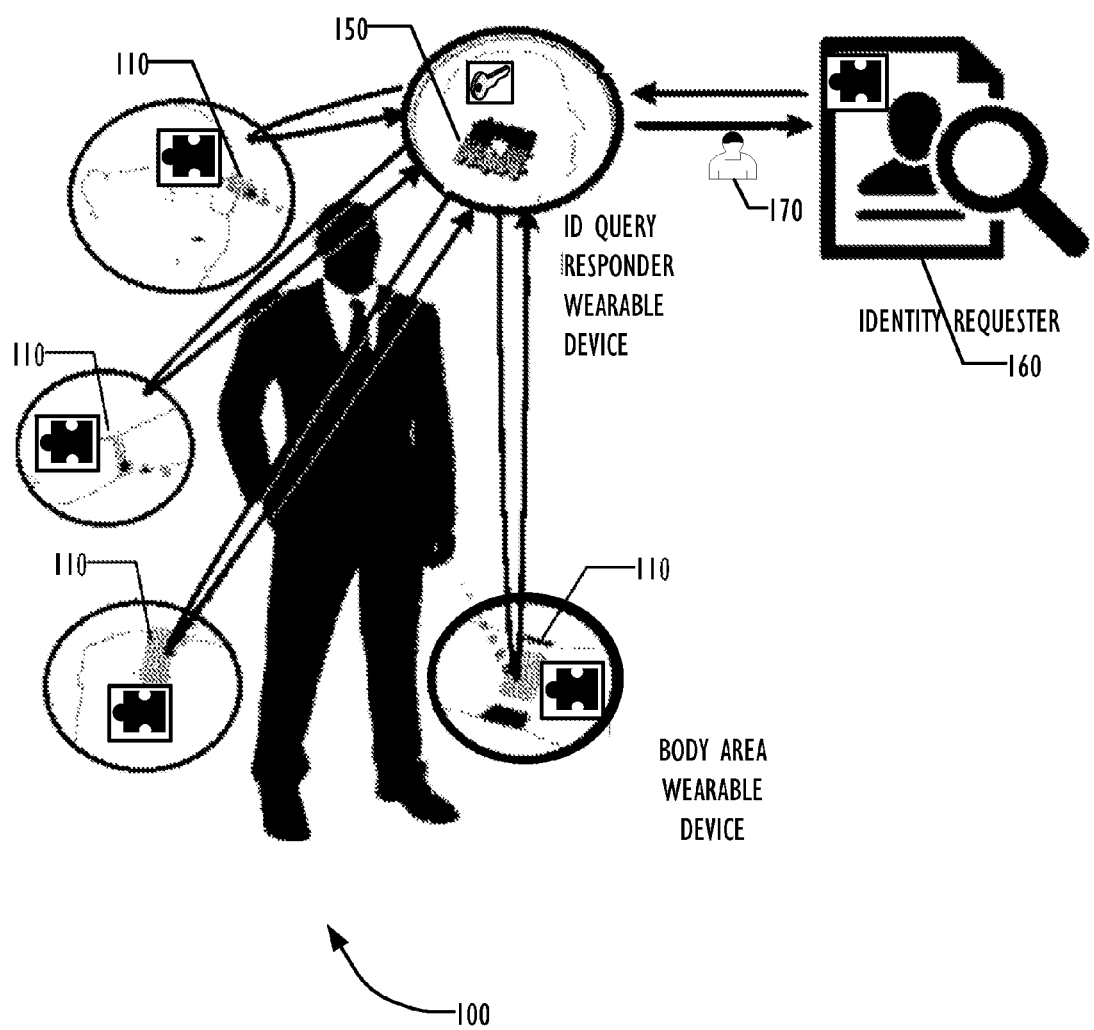
FIG. 2 is a block diagram illustrating a technique for allowing access to personal information using a secret shared among wearable devices and a requester according to one embodiment.
Figure 3:
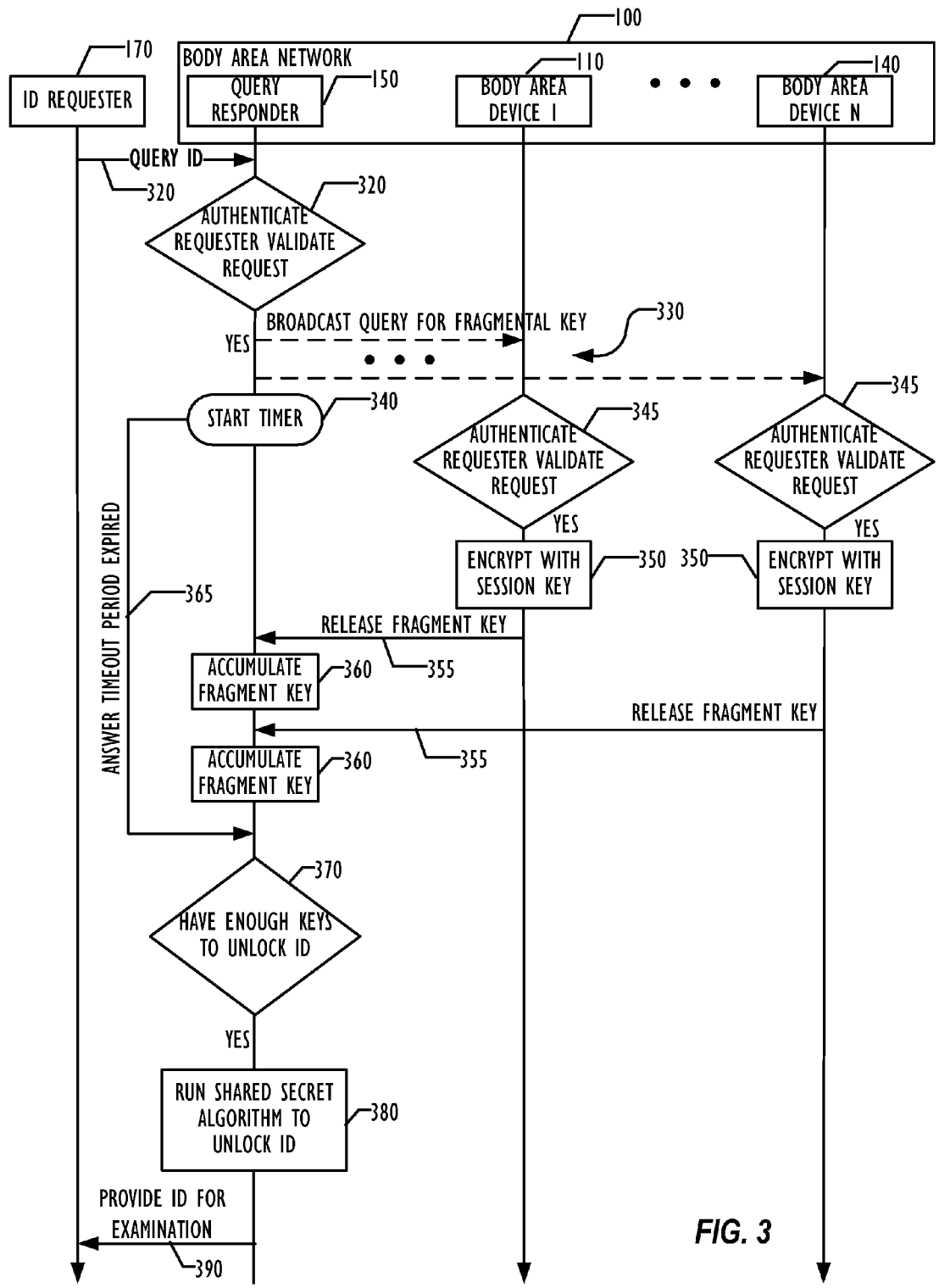
FIG. 3 is a flowchart illustrating a technique for securely releasing personal information using fragmented keys according to another embodiment.

FIG. 3 is a flowchart illustrating a technique for controlling and protecting the release of ID information in a system such as illustrated in FIGS. 1-2, according to one embodiment. The technique begins with a request for the ID information from the ID requester to the IDQRWD 150 of the BAN 100. The IDQRWD 150 then may validate the requester and the request. If, in block 320, the requester and the request are validated, using any desired validation technique, then the IDQRWD 150 may broadcast a query for fragmental keys to the BAWDs 110 of the BAN 100 in action 330. Although indicated as a broadcast, the IDQRWD 150 may communicate the query using any desired communication technique, including non-broadcast point-to-point communications. The IDQRWD 150 then waits for responses from the BAWDs 110

In one embodiment, the IDQRWD 150 may use a timer or other technique to limit the time that the BAWDs 110 have to respond to the request. The time limit may be configurable or may be a predetermined fixed value. As illustrated in FIG. 3, in block 340 the IDQRWD 150 starts a timer and if the timer expires, stops waiting (365) for further responses from the BAWDs 110.

As each BAWD 110 receives the query from the IDQRWD 150, the BAWD 110 may validate the query in block 345. In one embodiment, each BAWD 110 may perform its own authentication to validate the ID requester 160 and its ID request. In other embodiments, each BAWD 110 may validate the query from the IDQRWD 150, to authenticate the IDQRWD 150. If the authenticate succeeds, in block 350 each BAWD 110 may encrypt the fragmental key transmitted to the IDQRWD 150 in transaction 355 using a session key, typically a single-use symmetric key. Session key techniques are known in the art and are therefore not described here further. The encrypted fragmental key is then transmitted to the IDQRWD 150.

As the IDQRWD 150 receives fragmental keys, in block 360 the IDQRWD 150 decrypts the fragmental key, and accumulates the fragments. In block 370, the IDQRWD 150 determines whether the IDQRWD 150 has received enough fragmental keys to unlock the ID information. If so, then the IDQRWD 150 in block 380 uses a shared secret algorithm (such as described below) to unlock the ID information. The ID information can then be provided to the ID requester (390). The provided ID information provided to the ID requester is itself encrypted for transmission, typically using a session key technique, to avoid an unauthorized party from obtaining the provided ID information.

Figure 4:
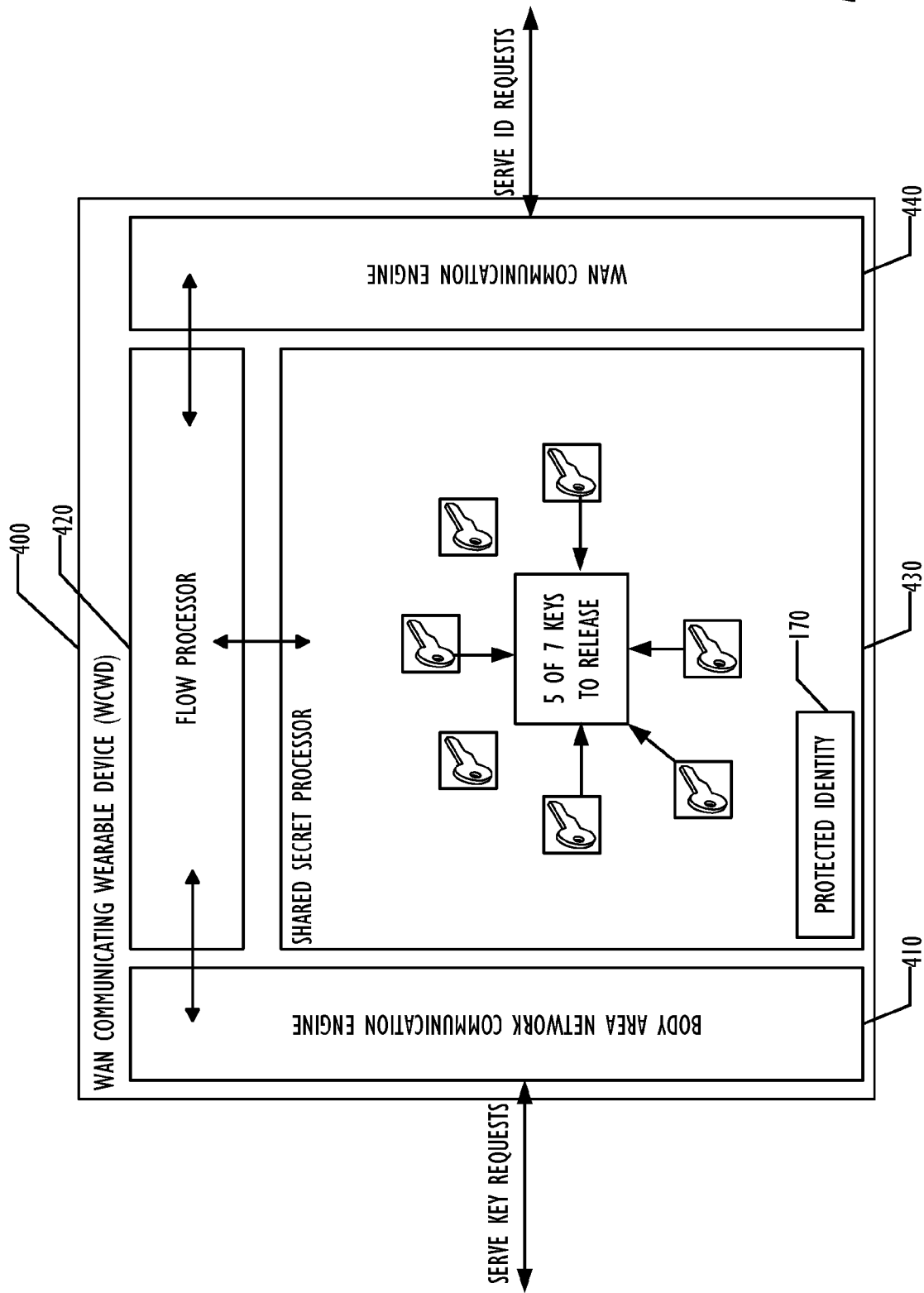
FIG. 4 is a block diagram illustrating a communicating wearable device according to one embodiment.

FIG. 4 is a block diagram illustrating an embodiment of a WAN communicating wearable device (WCWD) 400 than can function as an IDQRWD 150. As illustrated, the WCWD 400 includes four components: a BAN communication engine 410, a flow processor 420, a shared secret processor 430, and a WAN communication engine 440, described in more detail below.

The Body Area Network Communication Engine 410 is responsible for retrieving fragmental keys from the peer BAWDs 110. The Flow Processor 420 is responsible for implementing the ID release transaction. The Shared Secret Processor 430 keeps the ID protected by encrypting the ID information 170, using shared secret techniques, and unlocks the ID information 170 per request from the Flow processor 420. The WAN communication engine 440 is responsible for receiving requests from and providing ID information to the ID requester 160. The number of keys required to unlock the ID in one embodiment is configured during device activation and provisioning. For example, the WCWD may be configured that five of seven BAWDs registered with the WCWD 400 may be required to unlock the protected identity information 170. The WAN Communication Engine 440 listens to the ID queries coming from the ID requester 160 and triggers the ID release process after request is authenticated.

The modules or components 410, 420, 430, and 440 are typically implemented as a mixture of hardware and software or firmware elements, but may be implemented as either hardware, software, or firmware, or any mixture thereof, as desired. Both the Body Area Network Communication Engine 410 and the WAN Communication Engine 440 typically employ wireless communication interfaces, although a wired interface could be used. The Body Area Network Communication Engine 410 and the WAN Communication Engine 440 may use different communication interfaces and interface types. Each of the components 410-440 may be implemented in separate hardware devices that are operably linked to each other, or may be implemented in one or more modules that are internally linked to each other. In some embodiments, the flow processor 420 may be implemented using a hardware programmable control element or processor that is operably connected to the BAN and WAN interfaces 410 and 440, as well as the shared secret processor 430. the WCWD 400 and the BAWDs 110 are typically powered by one or more batteries, at least some of which may be rechargeable batteries. Although not described in detail in FIG. 4, other elements common in the art of programmable devices, such as memories and other elements described below in the discussion of FIGS. 8-9, may be included in any or all of the components 410-440. Provisioning of the WCWD 400 and the BAWDs 110 may be required to distribute the fragmental keys to the BAWDs 110. Other elements, including design elements and physical accoutrements that relate to the specific device may be included, such as clasps, clips, or other elements for attaching the BAWDs 110 to the wearer, permanently or removably.

As illustrated in FIG. 4, the shared secret processor 430 is configured to release the protected ID information 170 upon receipt of 5 of 7 possible key fragments, which may include a key fragment received from the ID requester 160, in addition to those received from the BAWDs 110.

In some embodiments, security hardening techniques may be applied to prevent ID leakage and to ensure adequate protection of the ID information 170. For example, the ID requests from the ID requester 160 may be signed with a special certificate issued by a trusted ID certificate source, such as a government, global ID providers, etc. Preferably, the WCWD 400 is able to use the special certificate for validation and authentication without Internet access, allowing use of the WCWD 400 as an IDQRWD 150 in places where online access is not available. In some embodiments, the IDQRWD 150 query to the BAWDs 110 may be signed with an IDQRWD certificate. To allow the BAWDs 110 to authenticate the request, the BAWDs 110 may receive the public key of the IDQRWD 150 at when provisioned as part of the BAN 100.

In one embodiment, both the IDQRWD 150 and the BAWDs 110 may implement a key release policy to help protect the ID information. Each device may check the state of the BAWD 110. For example, the wristband or bracelet 110 of FIG. 1 (or the IDQRWD 150) may check that the wristband 110 is attached and an attachment latch is closed. Similarly, either the BAWD 110 or the IDQRWD 150 (or both) may request user consent to release information if the ID request is not signed, is signed incorrectly, etc.

Both the IDQRWD 150 and the BAWDs 110 may be implemented with processor chipsets that provide a trusted execution environment (TEE) for the fragmental key handling and ID information release processing that can be used to limit the exposure to malware that may somehow be inserted into the device.

Protecting the ID information 170 with fragmented encryption keys helps reduce a risk that a lost, stolen, or inactive device can be used to obtain the ID information 170. The IDQRWD 150 can protect the ID information 170 against tracking, snooping, or harvesting attacks.

As described above, a secret sharing technique may be used by the IDQRWD 150 and BAWDs 110. Secret sharing techniques are known in the art, any desired secret sharing technique may be used. One example technique is described below.

In cryptography, secret sharing refers to a method for distributing a secret amongst a group of participants, each of which is allocated a share of the secret. A predefined number of participants are required to reconstruct the secret. Less than that numbers of participants are unable to reconstruct any part of the secret.

Given any secret S ∈F and a natural number k, an example Secret Sharing Algorithm divides S into n≥k pieces $S_1, \ldots, S_n$ in such a way that: (a) knowledge of any k or more pieces makes S easily computable; and (b) knowledge of any k−1 or fewer pieces leaves S completely undetermined. Formally, all of S's possible values are uniformly distributed.

If k=n then all of the n pieces are required together to reconstruct the secret. If k<n then less than n pieces are required together to reconstruct the secret, but any subset of k of the n pieces is sufficient to reconstruct the secret S.

In order to share an m-bits secret, we need to choose a field F with at least $2^m$ elements For example, we can choose F=R (real numbers).

The algorithm:

Step 1: choose at random k−1 coefficients $a_1, \ldots, a_{k-1}$ from field F and let S be $a_0$.

Step 2: compute $f(x)=a_0+a_1 x+a_2 x^2+ \ldots +a_{k-1}x^{k-1}$

Step 3: construct n points (i, $f(i)$) where i=1, 2, . . . , n.

Step 4: Given any subset of k of these pairs, we can find the coefficients of the polynomial by interpolation, and then evaluate $a_0$=S, which is the secret.

For our purpose, the secret S will be the Group Key (GK) shared with all of the n peer devices.

Observations:

Let g: F→F be a function from F to itself. Let $d_0, d_1, \ldots, d_m$ be distinct elements in F and $b_0, b_1, \ldots, b_m$ be random elements uniformly chosen from F (not necessarily different).

Note that $$g(x) = \sum_{i=0}^{m} b_i x^i$$

is a random polynomial.

Observation 1. Since g is a random polynomial, the vector $(g(d_0), \ldots, g(d_m))$ is also uniformly distributed in $F^{m+1}$ (i.e., the probability for $(g(d_0), \ldots, g(d_m))$ is equal for every m+1 d-values on $F^{m+1}$).

Observation 2. Let $f$ be a function defined by the values $(f(d_0), \ldots, f(d_m))$ and let g be the vector from the last observation. The result of summing $f$ by g is also uniformly distributed on $F^{m+1}$.

Thus, a secret sharing algorithm, such as the one described above, can be used to implement the sharing of fragmental keys among members of the BAN 100, allowing the IDQRWD 150 to protect the ID information 170.

In one embodiment, the IDQRWD 150 may be implemented to provide additional types of protection for data other than the ID information 170 of FIG. 1. In addition, the IDQRWD 150 may be implemented as a permanently or semi-permanently attached or implanted device, such as the permanent bracelet illustrated in FIG. 5. The attached or implanted IDQRWD may then also function as a connectivity root device (CRD), and provide protection to personal data both stored by detachable BAWDs (DWDs) 520, such as glasses, earphones, watches, and belt clips, as well as other personal data stored in a personal data space 540 in the personal cloud service 530.

When managing the other personal data, the CRD, disposed either on-body (e.g., a necklace) or in-body (e.g., implanted) can be leveraged as a proximity-based connectivity seed and connection manager for the user's BAN and transient wearables and sensors. This reduces the risk of potential leaks, losses, and theft of private information when users need to perform manual operations to engage with BANs, wearables, sensors, and the emerging IoT.

Once configured, the CRD can serve cloud connection initiation requests coming from DWDs matching the appropriate criteria, such as proximity, attached network ID, or running in a TEE (Trusted Execution Environment). A newly attached DWD on activation can poll the environment for a CRD and run a reliable and secure protocol to import settings needed for establishing connection to the appropriate personal service. Once the DWD device is connected to the BAN, it can listen for periodic Life Pulses (LPs) transmitted by the CRD. If no LP is received during a predefined period, the DWD can disconnect and erase connection settings and cached personal information.

This process is applicable both to the current reality where most of wearable devices are companions and connect thru another device (usually a smartphone), as well as in the future where every wearable device may have an independent connection channel. This protection of personal data may be performed in addition to or instead of the protection of personal ID information described above. In some embodiments, some wearable devices may participate in the protection of personal ID information, while other wearable devices in the same or a different BAN may participate in the protection of personal data. The protected personal data may include any desired type of personal data, including biometrical, biobehavioral, medical, geodetic location, etc.

Figure 5:
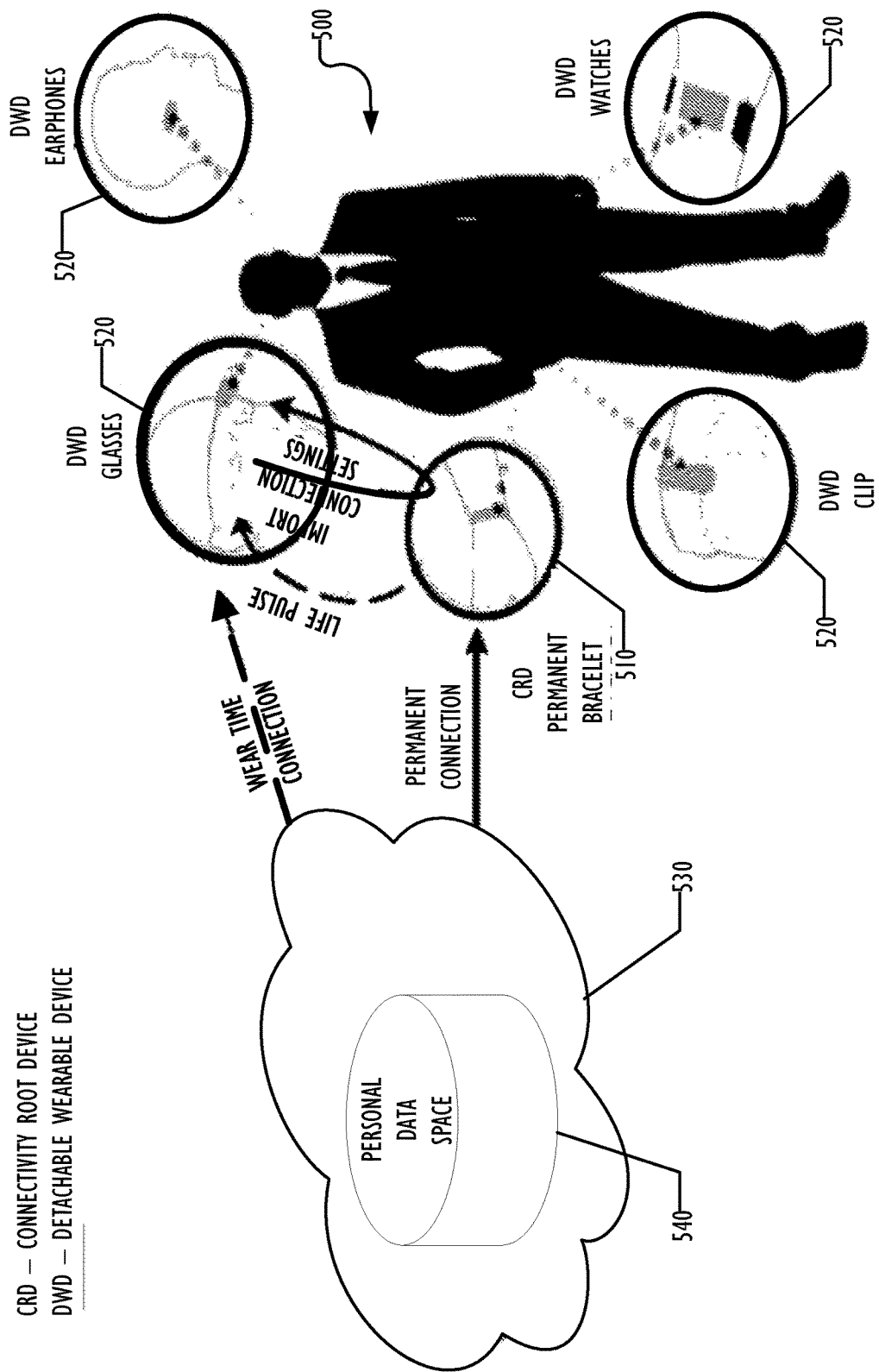
FIG. 5 is a block diagram illustrating a technique for controlling access to personal data based on a collection of wearable devices according to one embodiment.

In one embodiment illustrated in FIG. 5, the CRD 510 maintains a connection to external personal cloud services 530 that may provide external personal data spaces 540. The various DWDs 520 may also maintain local personal data spaces, such as an address book or browser history on a smartphone. The CRD 510 listens to connection configuration requests coming from the newly worn or attached DWDs 520 and monitors their proximity using any desired proximity detection technique, such as Receiver Signal Strength Indicator (RSSI)-based or Time of Flight (TOF) proximity detection.

Configuration settings can be provided in response to a connection configuration request if the DWD 520 matches one or more predefined criteria, such as being attached to the BAN 500 and running an LP check and erase procedure in a TEE, etc. In one embodiment, the CRD 510 may periodically broadcast an LP, helping DWDs 520 to detect a detach event.

DWDs 520 may manage connections to the personal cloud service 530 when worn, for access to the personal data space 540. In one embodiment, any personal data buffered on the DWD 520 may be automatically erased if the DWD 520 is detached from the BAN 500, in addition to closing any connection to the personal cloud service 530.

In one embodiment, the procedure that manages the automated disconnect and data wipe is signed and runs in a TEE of the DWD 520, which provides the CRD 510 with a way to perform remote attestation of the DWD 520. As a part of attach/detach and proximity detection, DWD listens to the LP broadcast by the CRD 510 over the BAN 500. Once detected, the DWD 520 may query the CRD 510 for connection settings that enable the DWD 520 to connect to the personal cloud service and the user's personal data space 540 managed by that personal cloud service 530.

When LP is missing for a pre-defined time or proximity limits have been reached, indicating the DWD 520 has separated from the BAN 500, the DWD 520 may automatically close the connection to the personal cloud service 530 and reliably erase buffered data held by the DWD 520.

Thus, the CRD 510 may maintain a permanent or semi-permanent connection to the personal cloud service 530 and personal data space 540, while the DWDs 520 maintain a connection only during the time the DWD 520 is worn.

Figure 6:
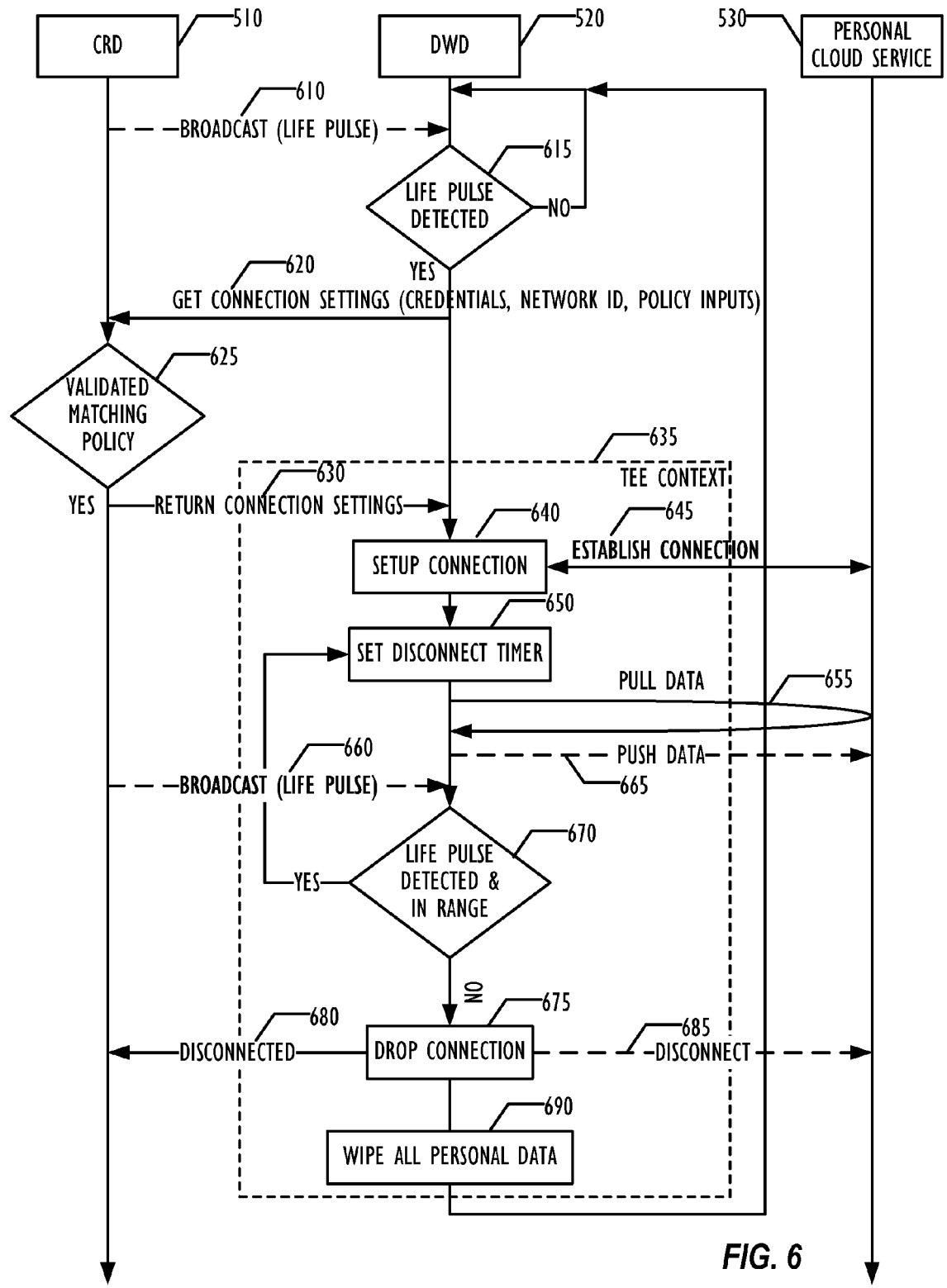
FIG. 6 is a flowchart illustrating a technique for securely controlling access to personal data based on a collection of wearable devices according to one embodiment.

FIG. 6 is a flowchart illustrating operation of a system for protecting personal data using a CRD 510 and DWDs 520 in cooperation with a personal cloud service 530 according to one embodiment. The CRD 510 broadcasts a life pulse 610 periodically. The period may be configurable, and is typically less than a server exchange period for the wearable devices. For example, the period may be configured to be 10 minutes when IoT devices are pushing data to or pulling data from the personal data space 540 once an hour. The life pulse may be any desired type of signal carrying any type of content. Preferably, the life pulse carries data that securely identifies the life pulse as coming from CRD 510 in a way that would be difficult to force. In block 615, the DWD 520 checks to see if a life pulse is detected. If not, the check can be repeated periodically until a life pulse is detected, thus the DWD 520 effectively waits until it receives a life pulse from the CRD 510.

Upon detecting the life pulse, the DWD 520 requests connection settings from the CRD 510 in request 620. The connection settings requested may include credentials, network identification information, policy inputs, etc. In block 625, the CRD 510 validates the DWD 520 as matching a security policy. If the DWD 520 is not validated, the request for connection settings may be ignored. For example, the security policy may validate the DWD 520 depending on various criteria, including whether the DWD 520 is attached to the BAN 500, whether the DWD 520 is running a disconnect and erase function in a TEE, whether the DWD 520 is in close proximity to the CRD 510, etc.

If the DWD 520 is validated, the CRD 510 may send connection settings to the DWD 520, where the connection settings are received (630) in a context of a TEE 635 for security. In block 640, the DWD 520 sets up the connection 645 with the personal cloud service 530, gaining access to personal data space 540. A disconnect timer may be set in block 650. If the timer expires before a life pulse is detected, the connection 645 may be dropped.

Once the connection 645 is made with the personal cloud service 530, transactions 655 and 665 may be used to pull data from and push data to the personal data space 540. If the DWD 520 is in range of the CRD 510, at some point during the timer period a new life pulse 660 may be received from the CRD. Upon expiration of the timer, in block 670 if a life pulse has been detected, then the timer may be reset and the DWD 520 may continue to share data with the personal data space 540.

If no life pulse is detected before the timer expires, then in block 675 the DWD 520 disconnects (685) from the personal cloud service 530, losing access to the personal data space 540, and notifies the CRD 510 of the disconnection (680). The DWD 520 then wipes all personal data from the DWD 520 in block 690, using any desired erasure technique.

This procedure allows a DWD 520 to protect personal data that may be accessible either on the DWD 520 or in the personal data space 540. A DWD 520 may be safely shared, transferred, or loaned to another person, who may use the DWD 520 without risking the new holder of the DWD 520 being able to access personal data previously stored on the DWD 520 by the previous holder of the device. Similarly, any holder of the DWD 520 may safely access personal data 540 of that holder in the personal cloud service 530, without risking undesired access should the DWD 520 come into the possession of a different person. A DWD 520 may be loaned or shared among people, such as family members or friends, with each person being able to access personal data from the personal data space 540 maintained by the personal cloud service 530 and storing personal data on the DWD 520, without having to share any person's personal data with another person.

Figure 7:
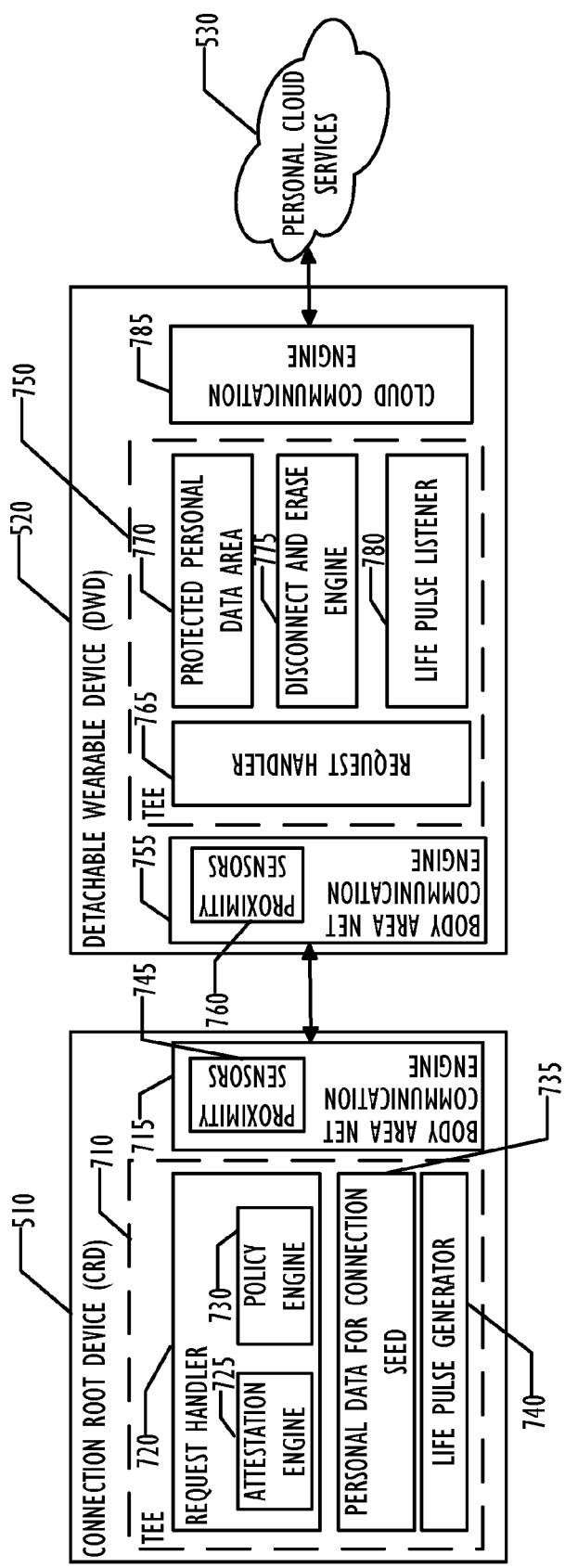
FIG. 7 is a block diagram illustrating a connection root device and a detachable wearable device communicating with personal information according to one embodiment.

FIG. 7 is a block diagram illustrating functional modules of the CRD 510 and DWDs 520 according to one embodiment. The functionality for using fragmental keys described above is omitted from FIG. 7 for clarity, but may be combined with the functionality described below as desired. The CRD 510 in one embodiment implements most of its functionality in a protected execution environment such as a TEE 710. A BAN communication engine 715 provides for communications with other members of the BAN 500, such as the DWDs 520. The BAN communication engine 715 is responsible for transmitting messages over the BAN 500 or any other configured alternative network, as well as for receiving messages from the DWDs 520. For non-wearable IoT devices, for example a smartphone, the network could be limited by network ID, key, etc. The BAN communication engine is also responsible for proximity detection, in which a proximity sensor 745 may be used to detect the proximity of DWDs 520. Although not illustrated in FIG. 7 for clarity, the CRD 510 may also include a WAN communication engine, for communicating with non-BAN systems. The BAN communication engine 715 may be shared by the personal data functionality described in FIG. 7 and the fragmental key and ID release functionality of FIG. 4. Similarly, if a WAN communication engine is provided, it may be the same WAN communication engine described in FIG. 4.

The Request handler 720 is responsible for attestation of the message source system and managing operation flow. The Attestation engine 725 is a part of the Request handler 720 and responsible for validation of the request details against security policies. The Policy engine 730 is responsible for maintaining policy configuration and checking logic conditions related to security policies that may be configured into the CRD 510.

The Personal data for the connection seed module 735 contains all the necessary data for establishing connections to the personal cloud service, such as keys, credentials, IDs, server URI, etc. This data can be provided to the DWDs 520 during provisioning of those wearable devices.

The Life Pulse Generator 740 is responsible for creating and transmitting life pulse packets over the BAN in a predefined configurable period of time. In one embodiment, the life pulse must be signed to enable attestation by the DWD 520.

In the DWDs 520, the BAN communication engine 755 provides for communications with other members of the BAN 500, such as the DWDs 520, and the CRD 510, The BAN communication engine 755 is responsible for transmitting messages over the BAN 500 or any other configured alternative network, as well as for receiving messages from the DWDs 520 or CRD 510. For non-wearable IoT devices, for example a smartphone, the network could be limited by network ID, key, etc. The BAN communication engine 755 is also responsible for proximity detection, in which a proximity sensor 760 may be used to detect the proximity of other DWDs 520 and the CRD 510.

The request handler 765 is responsible for the attestation of messages from the CRD 510 and is similar to the request handler 720 of the CRD 510.

The Cloud Communication engine 785 is a WAN communication engine configured for communicating with the personal cloud service 530 and the personal data space 540. Any desired type of wireless protocol may be used for the communication.

The remaining functionality of the DWD 520 in one embodiment is handled in the protected environment of the TEE 750. A request handler processes connection requests with the CRD 510. A protected personal data area 770 is a memory or other storage area controlled and protected by the TEE 750 for storing personal data associated with the wearer. A disconnect and erase engine 775 is responsible for personal information cleanup and connection closure, and is operable to erase the protected personal data area 770 upon disconnection from the CRD 510 and personal cloud service 530, as well as operable to cause disconnection from the CRD 510 and personal cloud service if no attested life pulse is detected within the configured life pulse period by the life pulse listener module 780. The Life Pulse Listener 780 listens to the life pulses transmitted by the CRD 510, and triggers the Disconnect and Erase engine 775 when the life pulse is missing during the pre-defined period. In one embodiment, the life pulse waiting period is configured to be smaller than the period for exchanging data between the DWD 520 and the personal cloud service, for example, 10 minutes, when IoT devices such as the DWDs 520 are pushing data to the personal data space once per hour.

Figure 8:
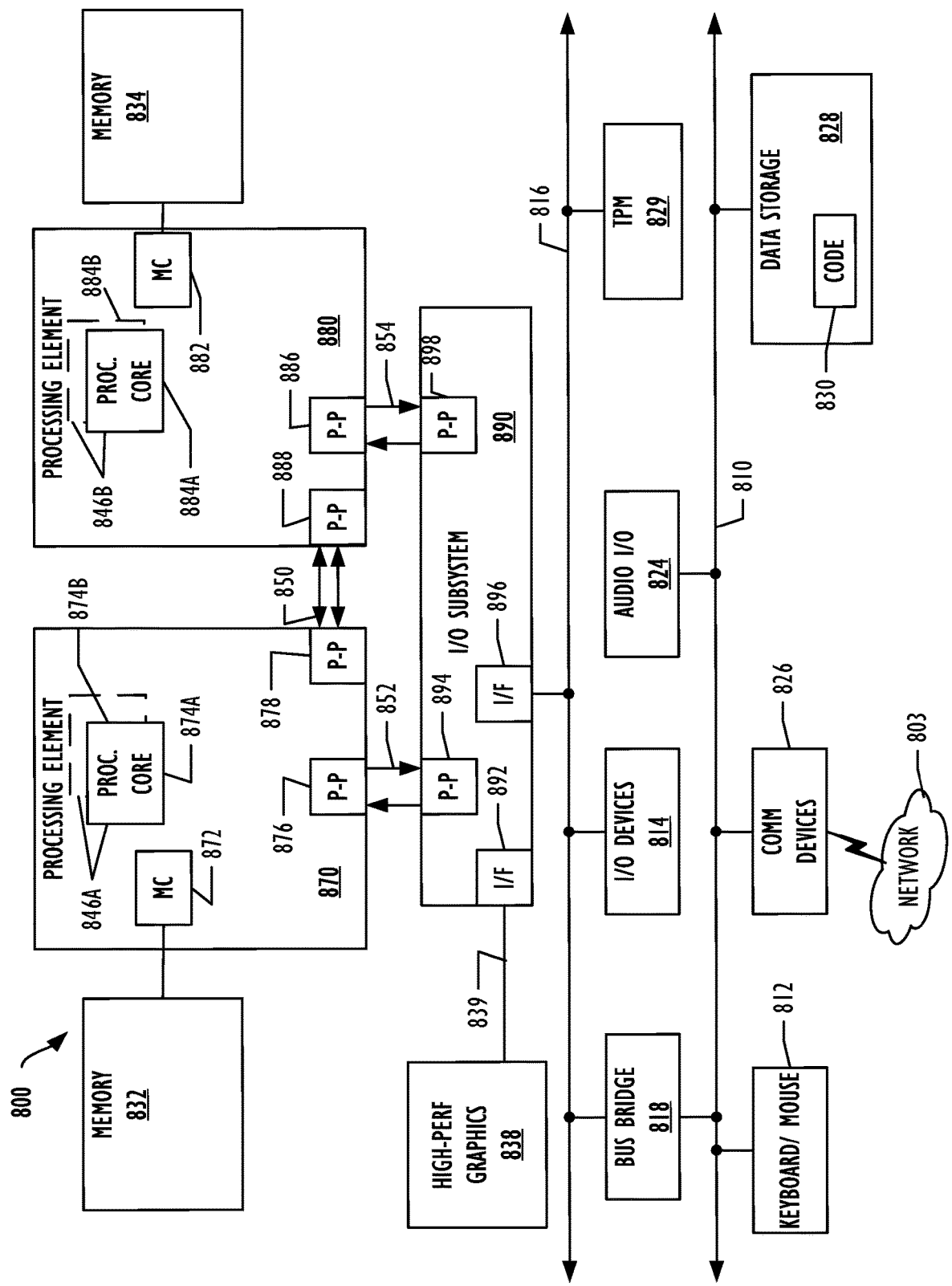
FIG. 8 is a block diagram illustrating a programmable device for use with techniques described herein according to one embodiment.

Referring now to FIG. 8, a block diagram illustrates a programmable device 800 that may be used for either the CRD 510 or the DWDs 520 in accordance with one embodiment. The programmable device illustrated in FIG. 8 is a multiprocessor programmable device 800 that includes a first processing element 870 and a second processing element 880. While two processing elements 870 and 880 are shown, an embodiment of programmable device 800 may also include only one such processing element.

Programmable device 800 is illustrated as a point-to-point interconnect system, in which the first processing element 870 and second processing element 880 are coupled via a point-to-point interconnect 850. Any or all of the interconnects illustrated in FIG. 8 may be implemented as multi-drop bus rather than point-to-point interconnects.

As illustrated in FIG. 8, each of processing elements 870 and 880 may be multicore processors, including first and second processor cores (i.e., processor cores 874a and 874b and processor cores 884a and 884b). Such cores 874a, 874b, 884a, 884b may be configured to execute instruction code in a manner similar to that discussed above in connection with FIGS. 1-4. However, other embodiments may use processing elements that are single core processors as desired. In embodiments with multiple processing elements 870, 880, each processing element may be implemented with different numbers of cores as desired.

Each processing element 870, 880 may include at least one shared cache 846. The shared cache 846a, 846b may store data (e.g., instructions) that are utilized by one or more components of the processing element, such as the cores 874a, 874b and 884a, 884b, respectively. For example, the shared cache may locally cache data stored in a memory 832, 834 for faster access by components of the processing elements 870, 880. In one or more embodiments, the shared cache 846a, 846b may include one or more mid-level caches, such as level 2(L2), level 3(L3), level 4(L4), or other levels of cache, a last level cache (LLC), or combinations thereof.

While FIG. 8 illustrates a programmable device with two processing elements 870, 880 for clarity of the drawing, the scope of the present invention is not so limited and any number of processing elements may be present. Alternatively, one or more of processing elements 870, 880 may be an element other than a processor, such as an graphics processing unit (GPU), a digital signal processing (DSP) unit, a field programmable gate array, or any other programmable processing element. Processing element 880 may be heterogeneous or asymmetric to processing element 870. There may be a variety of differences between the processing elements 870, 880 in terms of a spectrum of metrics of merit including architectural, microarchitectural, thermal, power consumption characteristics, and the like. These differences may effectively manifest themselves as asymmetry and heterogeneity amongst the processing elements 870, 880. In some embodiments, the various processing elements 870, 880 may reside in the same die package.

First processing element 870 may further include memory controller logic (MC) 872 and point-to-point (P-P) interfaces 876 and 878. Similarly, second processing element 880 may include a MC 882 and P-P interfaces 886 and 888. As illustrated in FIG. 8, MCs 872 and 882 couple the processing elements 870, 880 to respective memories, namely a memory 832 and a memory 834, which may be portions of main memory locally attached to the respective processors. While MC logic 872 and 882 is illustrated as integrated into the processing elements 870, 880, in some embodiments the MC logic may be discrete logic outside the processing elements 870, 880 rather than integrated therein.

Processing element 870 and processing element 880 may be coupled to an I/O subsystem 890 via P-P interfaces 876 and 886 and P-P interconnects 852 and 854, respectively. As illustrated in FIG. 8, I/O subsystem 890 includes P-P interfaces 894 and 898. Furthermore, I/O subsystem 890 includes an interface 892 to couple I/O subsystem 890 with a high performance graphics engine 838. In one embodiment, bus 839 may be used to couple graphics engine 838 to I/O subsystem 890. Alternately, a point-to-point interconnect 839 may couple these components.

In turn, I/O subsystem 890 may be coupled to a first link 816 via an interface 896. In one embodiment, first link 816 may be a Peripheral Component Interconnect (PCI) bus, or a bus such as a PCI Express bus or another I/O interconnect bus, although the scope of the present invention is not so limited.

As illustrated in FIG. 8, various I/O devices 814 may be coupled to first link 816, along with a bridge 818 which may couple first link 816 to a second link 810. In one embodiment, second link 810 may be a low pin count (LPC) bus. Various devices may be coupled to second link 810 including, for example, a keyboard/mouse 812, communication device(s) 826 (which may in turn be in communication with the computer network 803), and a data storage unit 828 such as a disk drive or other mass storage device which may include code 830, in one embodiment. The code 830 may include instructions for performing embodiments of one or more of the techniques described above. Further, an audio I/O 824 may be coupled to second bus 810.

A trusted program module (TPM) 829 may be coupled to the I/O subsystem 890 or elsewhere in the programmable device 800 for providing the TEE 710 or 750. The TPM 829 typically is cryptographically controlled and restricts execution to only executable code signed with a cryptographic key. The TPM 829 may be implemented as a separate chip or chipset from the processing elements, or may be packaged as part of a chipset providing some or all of the elements illustrated in FIG. 8.

Note that other embodiments are contemplated. For example, instead of the point-to-point architecture of FIG. 8, a system may implement a multi-drop bus or another such communication topology. Although links 816 and 810 are illustrated as busses in FIG. 8, any desired type of link may be used. In addition, the elements of FIG. 8 may alternatively be partitioned using more or fewer integrated chips than illustrated in FIG. 8. For example, the components may be implemented as networked (LAN, enterprise network, Internet and/or distributed in the cloud) computing devices (real or virtual) or microcontrollers which jointly perform the 230 function.

Figure 9:
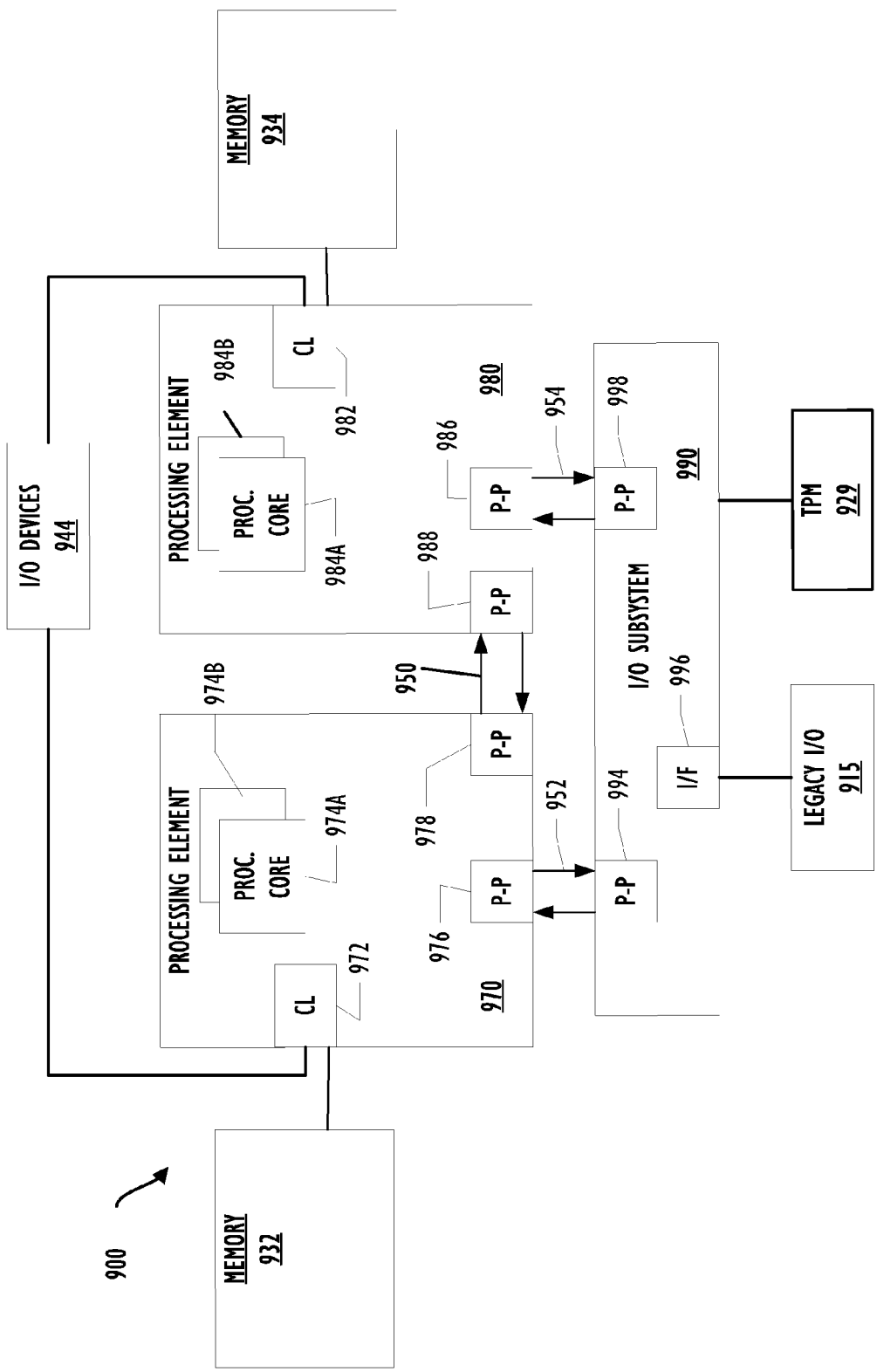
FIG. 9 is a block diagram illustrating a programmable device for use with techniques described herein according to another embodiment.

Referring now to FIG. 9, a block diagram illustrates a programmable device 900 according to another embodiment. Certain aspects of FIG. 8 have been omitted from FIG. 9 in order to avoid obscuring other aspects of FIG. 9.

FIG. 9 illustrates that processing elements 970, 980 may include integrated memory and I/O control logic ("CL") 972 and 982, respectively. In some embodiments, the CL 972, 982 may include memory control logic (MC) such as that described above in connection with FIG. 8. In addition, CL 972, 982 may also include I/O control logic. FIG. 9 illustrates that not only may the memories 932, 934 be coupled to the CL 972, 982, but also that I/O devices 944 may also be coupled to the control logic 972, 982. Legacy I/O devices 915 may be coupled to the I/O subsystem 990 by interface 996. Each processing element 970, 980 may include multiple processor cores, illustrated in FIG. 9 as processor cores 974A, 974B, 984A, and 984B. As illustrated in FIG. 9, I/O subsystem 990 includes P-P interfaces 994 and 998 that connect to P-P interfaces 976 and 986 of the processing elements 970 and 980 with interconnects 952 and 954. Processing elements 970 and 980 may also be interconnected by interconnect 950 and interfaces 978 and 988, respectively.

As with the programmable device 800, the programmable device 900 may contain a TPM 929.

The programmable devices depicted in FIGS. 8 and 9 are schematic illustrations of embodiments of programmable devices that may be utilized to implement various embodiments discussed herein. Various components of the programmable devices depicted in FIGS. 8 and 9 may be combined in a system-on-a-chip (SoC) architecture.

The following examples pertain to further embodiments.

Example 1 is a programmable wearable device for use in a body area network, comprising: a programmable processor; and a memory, on which are stored instructions that when executed cause the programmable processor to: receive a request for a stored personal information; receive a first plurality of fragmental keys, employ the first plurality of fragmental keys to unlock the stored personal information; and transmit the stored personal information responsive to the request, wherein the first plurality of fragmental keys is a subset of a second plurality of fragmental keys, the subset having a predefined cardinality relative to the cardinality of the second plurality of fragmental keys.

In Example 2, the subject matter of Example 1 can optionally include: a body area network communication interface, configured to communicate with members of a body area network.

In Example 3, the subject matter of Example 1 can optionally include: a wide area network communication interface, configured to receive the request for the stored personal information and to transmit the stored personal information responsive to the request.

In Example 4, the subject matter of Examples 1-3 can optionally include: a trusted execution environment, operable to perform the instructions to employ the first plurality of fragmental keys; and store the personal information.

In Example 5, the subject matter of Examples 1-3 can optionally include wherein the instructions further comprise instructions to broadcast a request for fragmental keys.

In Example 6, the subject matter of Examples 1-3 can optionally include wherein the instructions further comprise instructions that when executed cause the programmable processor to: broadcast periodically a life pulse.

In Example 7, the subject matter of Examples 1-3 can optionally include wherein the instructions further comprise instructions that when executed cause the programmable processor to: transmit provisioning information to other members of the body area network.

In Example 8, the subject matter of Examples 1-3 can optionally include wherein the request for the personal information comprises a requester fragmental key, and wherein the requester fragmental key is employed with the plurality of fragmental keys to decrypt the stored personal information.

Example 9 is a programmable wearable device for use in a body area network, comprising: a programmable processor; and a memory, on which are stored instructions that when executed cause the programmable processor to: receive a request for a fragmental key; validate the request; encrypt the fragmental key with a session key; and transmit the fragmental key responsive to the request.

In Example 10, the subject matter of Example 9 can optionally include wherein the request is a broadcast request.

In Example 11, the subject matter of Example 9 can optionally include wherein the instructions that when executed cause the programmable processor to validate the request and encrypt the fragmental key with a session key are performed in a trusted execution environment.

In Example 12, the subject matter of Examples 9-11 can optionally include: a protected personal data area of a trusted execution environment, and wherein the instructions further comprise instructions that when executed cause the programmable processor to: erase the protected personal data area unless a life pulse is received within a predetermined time period.

In Example 13, the subject matter of Example 12 can optionally include wherein the instructions further comprise instructions that when executed cause the programmable processor to: receive a life pulse; and validate the life pulse.

In Example 14, the subject matter of Example 12 can optionally include where the instructions further comprise instructions that when executed cause the programmable processor to: disconnect from a personal cloud service unless a life pulse is received within the predetermined time period.

Example 15 is a machine readable medium, on which are stored instructions, comprising instructions that when executed cause a wearable programmable device to: receive a request for a stored personal information; broadcast a request for a first plurality of fragmental keys on a body area network, receive the first plurality of fragmental keys responsive to broadcasting the request; employ the first plurality of fragmental keys to unlock the stored personal information; and transmit the stored personal information responsive to the request, wherein the first plurality of fragmental keys is a subset of a second plurality of fragmental keys, the subset having a predefined cardinality relative to the cardinality of the second plurality of fragmental keys.

In Example 16, the subject matter of Example 15 can optionally include wherein the instructions that when executed cause the programmable device to broadcast a request for a first plurality of fragmental keys comprise instructions that when executed cause the programmable device to broadcast the request via a body area network interface.

In Example 17, the subject matter of Example 15 can optionally include wherein the instructions that when executed cause the programmable device to transmit the stored personal information comprise instructions that when executed cause the programmable device to: encrypt the stored personal information; and transmit the stored personal information via a wide area network interface.

In Example 18, the subject matter of Examples 15-17 can optionally include wherein at least a portion of the instructions are performed in a trusted execution environment of the programmable device.

In Example 19, the subject matter of Examples 15-17 can optionally include wherein the instructions further comprise instructions that when executed cause the programmable device to: provision other wearable devices of the body area network.

Example 20 is a method of protecting personal identity information, comprising: encrypting the personal identity information using a shared secret; provisioning fragmental keys of the shared secret to members of a body area network; receiving a request for the personal identity information; transmitting a request for fragmental keys on the body area network; receiving a plurality of fragmental keys on the body area network; employing the plurality of fragmental keys to decrypt the personal identity information; and transmitting the personal identity information responsive to the request.

In Example 21, the subject matter of Example 20 can optionally include wherein transmitting the personal identity information comprises: encrypting the personal identity information; and transmitting the encrypted personal identity information.

In Example 22, the subject matter of Example 20 can optionally include wherein the plurality of fragmental keys is a subset of the fragmental keys provisioned to members of the body area network.

In Example 23, the subject matter of Example 20 can optionally include wherein receiving a request for the personal identity information comprises: receiving a fragmental key in the request.

In Example 24, the subject matter of Example 20 can optionally include wherein employing the plurality of fragmental keys to decrypt the personal identity information comprises: employing the plurality of fragmental keys to decrypt the personal identity information in a trusted execution environment of a wearable device.

In Example 25, the subject matter of Examples 20-24 can optionally include: storing personal data in a protected storage area; and erasing the personal data unless a life pulse is received within a predetermined time period.

Example 26 is a wearable programmable device, comprising: a first communication engine operable to: receive a request for a stored personal information; and transmit the stored personal information responsive to the request; a second communication engine operable to: broadcast a request for a first plurality of fragmental keys on a body area network; and receive the first plurality of fragmental keys responsive to broadcasting the request; a shared secret processor operable to employ the first plurality of fragmental keys to unlock the stored personal information, wherein the first plurality of fragmental keys is a subset of a second plurality of fragmental keys, the subset having a predefined cardinality relative to the cardinality of the second plurality of fragmental keys.

In Example 27, the subject matter of Example 26 can optionally include wherein the first communication engine broadcasts the request via a body area network interface.

In Example 28, the subject matter of Example 26 can optionally include wherein shared secret processor is further operable to encrypt the stored personal information before the wearable programmable device transmits the stored personal information via a wide area network interface.

In Example 29, the subject matter of Examples 26-28 can optionally include wherein the shared secret processor comprises a trusted execution environment of the programmable device.

In Example 30, the subject matter of Examples 26-28 can optionally include: a flow processor operable to provision other wearable devices of the body area network.

Example 31 is a programmable wearable device for use in a body area network, comprising: a programmable processor; a memory, on which are stored instructions that when executed cause the programmable processor to: receive a request for a stored personal information; receive a first plurality of fragmental keys, employ the first plurality of fragmental keys to unlock the stored personal information; and transmit the stored personal information responsive to the request, wherein the first plurality of fragmental keys is a subset of a second plurality of fragmental keys, the subset having a predefined cardinality relative to the cardinality of the second plurality of fragmental keys; a body area network communication interface, configured to communicate with members of a body area network; and a wide area network communication interface, configured to receive the request for the stored personal information and to transmit the stored personal information responsive to the request.

In Example 32, the subject matter of Example 31 can optionally include: a trusted execution environment, operable to perform the instructions to employ the first plurality of fragmental keys; and store the personal information.

In Example 33, the subject matter of Examples 31-32 can optionally include wherein the instructions further comprise instructions to broadcast a request for fragmental keys.

In Example 34, the subject matter of Examples 31-33 can optionally include wherein the instructions further comprise instructions that when executed cause the programmable processor to: broadcast periodically a life pulse.

In Example 35, the subject matter of Examples 31-34 can optionally include wherein the instructions further comprise instructions that when executed cause the programmable processor to: transmit provisioning information to other members of the body area network.

In Example 36, the subject matter of Examples 31-35 can optionally include wherein the request for the personal information comprises a requester fragmental key, and wherein the requester fragmental key is employed with the plurality of fragmental keys to decrypt the stored personal information.

Example 37 is a programmable wearable device for use in a body area network, comprising: a programmable processor; and a memory, on which are stored instructions that when executed cause the programmable processor to: receive a request for a fragmental key; validate the request; encrypt the fragmental key with a session key; and transmit the fragmental key responsive to the request.

In Example 38, the subject matter of Example 37 can optionally include wherein the instructions that when executed cause the programmable processor to validate the request and encrypt the fragmental key with a session key are performed in a trusted execution environment.

In Example 39, the subject matter of Examples 37-38 can optionally include: a protected personal data area of a trusted execution environment, and wherein the instructions further comprise instructions that when executed cause the programmable processor to: receive a life pulse; validate the life pulse; and erase the protected personal data area and disconnect from a personal cloud service unless the life pulse is received within a predetermined time period.

Example 40 is a machine readable medium, on which are stored instructions, comprising instructions that when executed cause a wearable programmable device to: receive a request for a stored personal information; broadcast a request for a first plurality of fragmental keys on a body area network, receive the first plurality of fragmental keys responsive to broadcasting the request; employ the first plurality of fragmental keys to unlock the stored personal information; encrypt the stored personal information; and transmit the stored personal information responsive to the request, wherein the first plurality of fragmental keys is a subset of a second plurality of fragmental keys, the subset having a predefined cardinality relative to the cardinality of the second plurality of fragmental keys, wherein at least a portion of the instructions are performed in a trusted execution environment of the programmable device.

In Example 41, the subject matter of Example 40 can optionally include wherein the instructions that when executed cause the programmable device to broadcast a request for a first plurality of fragmental keys comprise instructions that when executed cause the programmable device to broadcast the request via a body area network interface.

In Example 42, the subject matter of Examples 40-41 can optionally include wherein at least a portion of the instructions are performed in a trusted execution environment of the programmable device.

Example 43 is a method of protecting personal identity information, comprising: encrypting the personal identity information using a shared secret; provisioning fragmental keys of the shared secret to members of a body area network; receiving a request for the personal identity information; transmitting a request for fragmental keys on the body area network; receiving a plurality of fragmental keys on the body area network; employing the plurality of fragmental keys to decrypt the personal identity information in a trusted execution environment of a wearable device; encrypting the personal identity information; and transmitting the encrypted personal identity information responsive to the request, wherein the plurality of fragmental keys is a subset of the fragmental keys provisioned to members of the body area network.

In Example 44, the subject matter of Example 43 can optionally include wherein receiving a request for the personal identity information comprises: receiving a fragmental key in the request.

In Example 45, the subject matter of Examples 43-44 can optionally include: storing personal data in a protected storage area; and erasing the personal data unless a life pulse is received within a predetermined time period.

It is to be understood that the above description is intended to be illustrative, and not restrictive. For example, the above-described embodiments may be used in combination with each other. Many other embodiments will be apparent to those of skill in the art upon reviewing the above description. The scope of the invention therefore should be determined with reference to the appended claims, along with the full scope of equivalents to which such claims are entitled.

What is claimed is:

1. A programmable wearable device for use in a body area network, comprising:
   a programmable processor; and
   a memory, on which are stored instructions to provide allowing access to personal information using a shared secret, comprising instruction that when executed cause the programmable processor to:
   receive a request for a stored personal information;
   broadcast a request for fragmental keys on the body area network;
   receive a first plurality of fragmental keys from other members of the body area network responsive to broadcasting the request,
   employ the first plurality of fragmental keys to unlock the stored personal information; and
   transmit the stored personal information responsive to the request for the stored personal information,
   wherein the first plurality of fragmental keys is a subset of a second plurality of fragmental keys, the subset having a predefined cardinality relative to the cardinality of the second plurality of fragmental keys.

2. The programmable wearable device of claim 1, further comprising:
   a body area network communication interface, configured to communicate with members of a body area network.

3. The programmable wearable device of claim 1, further comprising:
   a wide area network communication interface, configured to receive the request for the stored personal information and to transmit the stored personal information responsive to the request.

4. The programmable wearable device of claim 1, further comprising:
   a trusted execution environment, programmed to perform the instructions to employ the first plurality of fragmental keys; and store the personal information.

5. The programmable wearable device of claim 1, wherein the instructions further comprise instructions to broadcast a request for fragmental keys.

6. The programmable wearable device of claim 1, wherein the instructions further comprise instructions that when executed cause the programmable processor to:
   broadcast periodically a life pulse.

7. The programmable wearable device of claim 1, wherein the instructions further comprise instructions that when executed cause the programmable processor to:
   transmit provisioning information to other members of the body area network.

8. The programmable wearable device of claim 1,
   wherein the request for the personal information comprises a requester fragmental key, and
   wherein the requester fragmental key is employed with the plurality of fragmental keys to decrypt the stored personal information.

9. A non-transitory machine readable medium, on which are stored instructions for allowing access to personal information using a shared secret, comprising instructions that when executed cause a wearable programmable device to:
   receive a request for a stored personal information;
   broadcast a request for a first plurality of fragmental keys on a body area network, receive the first plurality of fragmental keys from other members of the body area network responsive to broadcasting the request;

employ the first plurality of fragmental keys to unlock the stored personal information; and transmit the stored personal information responsive to the request for the stored personal information, wherein the first plurality of fragmental keys is a subset of a second plurality of fragmental keys, the subset having a predefined cardinality relative to the cardinality of the second plurality of fragmental keys.

10. The machine readable medium of claim 9, wherein the instructions that when executed cause the programmable device to broadcast a request for a first plurality of fragmental keys comprise instructions that when executed cause the programmable device to broadcast the request via a body area network interface.

11. The machine readable medium of claim 9, wherein the instructions that when executed cause the programmable device to transmit the stored personal information comprise instructions that when executed cause the programmable device to:

encrypt the stored personal information; and transmit the stored personal information via a wide area network interface.

12. The machine readable medium of claim 9, wherein at least a portion of the instructions are performed in a trusted execution environment of the programmable device.

13. The machine readable medium of claim 9, wherein the instructions further comprise instructions that when executed cause the programmable device to:

provision other wearable devices of the body area network.

14. A method of protecting personal identity information and allowing access to the personal identity information using a shared secret, comprising:

encrypting the personal identity information using a shared secret;

provisioning fragmental keys of the shared secret to members of a body area network;

receiving a request for the personal identity information;

broadcasting a request for fragmental keys on the body area network;

receiving a plurality of fragmental keys on the body area network from other members of the body area network responsive to broadcasting the request;

employing the plurality of fragmental keys to decrypt the personal identity information; and transmitting the personal identity information responsive to the request for the personal identity information.

15. The method of claim 14, wherein transmitting the personal identity information comprises:

encrypting the personal identity information; and transmitting the encrypted personal identity information.

16. The method of claim 14, wherein the plurality of fragmental keys is a subset of the fragmental keys provisioned to members of the body area network.

17. The method of claim 14, wherein receiving a request for the personal identity information comprises:

receiving a fragmental key in the request.

18. The method of claim 14, wherein employing the plurality of fragmental keys to decrypt the personal identity information comprises:

employing the plurality of fragmental keys to decrypt the personal identity information in a trusted execution environment of a wearable device.

19. The method of claim 14, further comprising:

storing personal data in a protected storage area; and erasing the personal data unless a life pulse is received within a predetermined time period.

* * * * *